United States Patent [19]

Reid

[11] Patent Number: 4,636,423
[45] Date of Patent: Jan. 13, 1987

[54] DOCK SHELTER FABRIC

[75] Inventor: James S. Reid, Concord, N.C.

[73] Assignee: Graniteville Company, Graniteville, S.C.

[21] Appl. No.: 781,521

[22] Filed: Sep. 30, 1985

Related U.S. Application Data

[63] Continuation-in-part of Ser. No. 694,788, Jan. 25, 1985, abandoned.

[51] Int. Cl.$^4$ .......................... B32B 3/00; B32B 27/14
[52] U.S. Cl. ..................................... 428/196; 14/71.1; 52/173 R; 427/261; 427/288; 428/213; 428/215; 428/252
[58] Field of Search ............... 428/196, 213, 215, 252; 14/71.1; 52/173; 427/261, 288

[56] References Cited

U.S. PATENT DOCUMENTS 4,293,969  10/1981  Frommelt .......................... 14/71.1
4,381,631   5/1984  Frommelt .......................... 52/173

Primary Examiner—Marion C. McCamish
Attorney, Agent, or Firm—Clifton Ted Hunt

[57] ABSTRACT

A dock shelter fabric comprising a core fabric formed from synthetic fibers, a base coat of polymeric material extending continuously over at least the one surface of the core fabric intended to be exposed to abrasion, and a second polymeric coating of abrasion resistant polymeric material fused in a discontinuous pattern to the continuous surface of the base coat; whereby the discontinuous coating resists abrasion without sacrificing flexibility of the fabric.

39 Claims, 6 Drawing Figures

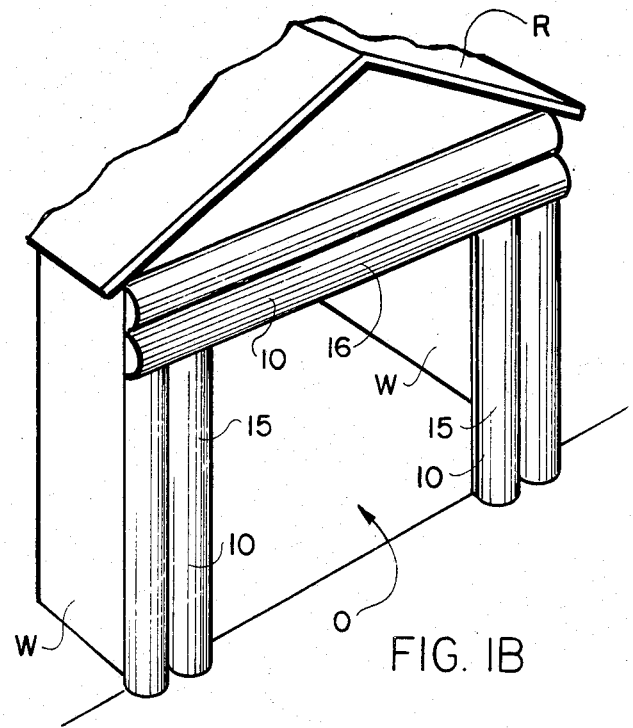
FIG. IB

DOCK SHELTER FABRIC

CROSS REFERENCE TO RELATED APPLICATION

This application is a continuation-in-part of my prior application Ser. No. 694,788 filed Jan. 25, 1985 now abandoned.

BACKGROUND OF THE INVENTION

This invention relates to an abrasion resistant fabric particularly useful in dock shelters. Dock Shelters are used around doorways and openings in walls of buildings to protect building structure from impact with a truck body, and to provide protection from the weather in the space between the truck body and the building during the loading and unloading of the contents of the truck.

Dock shelters are made in several different ways. One popular version includes a flexible head curtain or panel of a heavy fabric of the type used for truck tarpaulins. The head panel is supported along its top edges and positioned to extend across the upper portion of a doorway or opening for engagement with the top of a truck body positioned for loading or unloading. Side curtains extend downwardly from the top of the opening and inwardly toward each other from the sides of the opening or doorway to engage the sides of a truck body being loaded or unloaded.

The head panel and side panels are subjected to considerable stress and wear because of the engagement with the truck body and because the panels are exposed to the wind and weather causing repeated flexing and snapping and considerable wear and strain requiring frequent replacement of the panels.

Another type of dock shelter uses cloth covered pads or bumpers on the corners and edges of the loading dock positioned for engagement with a truck as its moves into position for loading or unloading. The pads or bumpers may be filled with foam padding or may be inflatable as shown in U.S. Pat. No. 4,293,969.

The abrasion resistant fabric of this invention is useful in such dock shelters and in dock shelters of the type disclosed and claimed in U.S. Pat. No. 4,381,631 entitled LOADING DOCK SHELTERS and issued May 3, 1984 upon application of Sylvan J. Frommelt. The invention is also useful in other environments where the properties of abrasion resistance and flexibility are important in the fabric.

SUMMARY OF THE INVENTION

The abrasion resistant fabric of the present invention comprises a base or core coated on one or both surfaces with polyvinylchloride. A second coating of an abrasion resistant polymer or epoxy is applied in a dot or line configuration to the surface of the polyvinylchloride. The base fabric may be formed from yarn comprising synthetic fibers such as polyaramide, polyester, polypropylene, nylon, or any desired combination thereof, or from other fibers possessing comparable strength and fastness. The base fabric may be formed from such yarn by weaving, by weft insertion, and by knitting. Knitting for the core fabric is preferably done by the COFAB process. COFAB is a registered trademark of Gulf States Paper Corporation, P.O. Box 3199, Tuscaloosa, Alabama 35404. The abrasion resistant polymer may be polyvinylchloride, urethane, neoprene, Hypalon or other desired abrasion resistant material. The dot or line configuration of the second coating increases the abrasion resistance of the fabric and retains or, in some instances, obtains the flexibility desired for use of the fabric as dock shelters, dock pads, rail shelters, truck tarpaulins, tents and the like.

It is known to coat woven core fabrics with such abrasion resistant material as neoprene and Hypalon. In some instances the thickness of the coating which is sufficient to afford the desired abrasion resistance renders the fabric substantially inflexible or at least less flexible than desired. It has been found that applying an abrasion resistant coating in a dot or line configuration on a polyvinylchloride coated core fabric obtains the desired abrasion resistance with a thinner coating and lighter fabric having the desired flexibility.

BRIEF DESCRIPTION OF THE DRAWINGS

FIG. 1B is a view similar to FIG. 1 illustrating a third type of dock shelter;

DETAILED DESCRIPTION OF THE INVENTION

Referring more specifically to the drawings, the numeral 10 broadly indicates an abrasion resistant fabric. Such fabric is useful in any environment where it is desired that the fabric have a high abrasion resistance and reasonable flexibility. One such environment is illustrated in FIGS. 1, 1A and 1B wherein a dock shelter is broadly indicated at 11.

Figure 1:
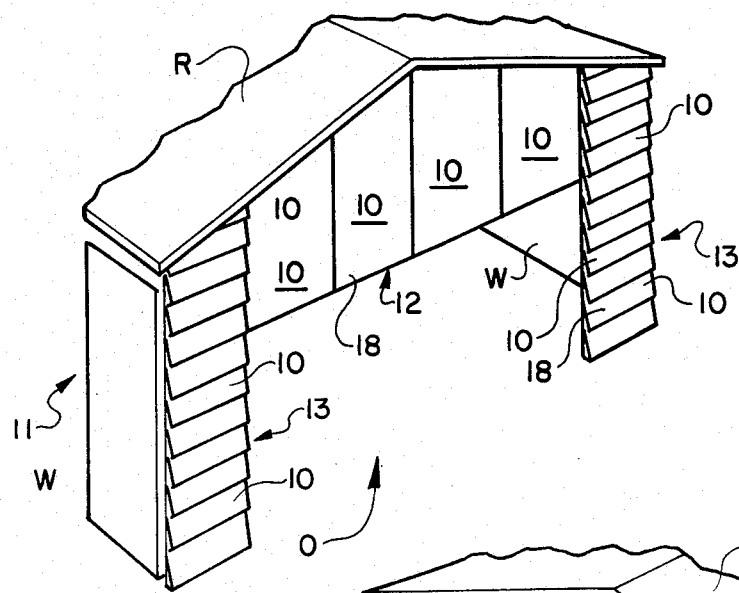
FIG. 1 is a fragmentary perspective view, with parts broken away, of a loading dock shelter.
Figure 1A:
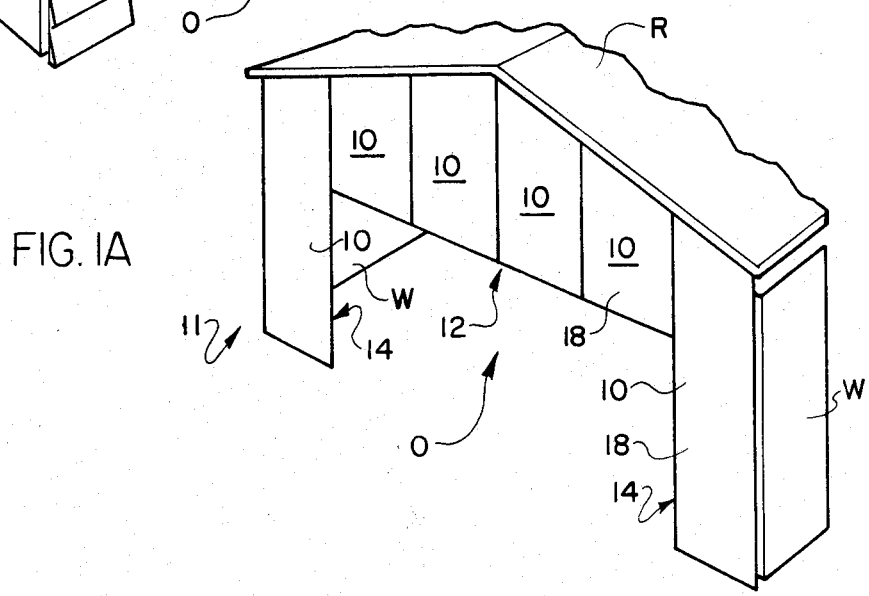
FIG. 1A is a view similar to FIG. 1 illustrating a second type of loading dock shelter.

In FIGS. 1, 1A, and 1B the dock shelter 11 includes a roof R and side walls W of conventional construction. The dock shelters of FIGS. 1 and 1A include a top panel broadly indicated at 12 and comprising a plurality of individual strips of abrasion resistant fabric 10 depending from the roof R and arranged in overlapping relation to each other beneath the roof R and between the side walls W. In FIG. 1, side panels broadly indicated at 13 are defined by overlapping vertically arranged strips of abrasion resistant fabric 10. In FIG. 1A, side panels 14 are defined by elongated strips of abrasion resistant fabric 10.

The inner margins of the top panel 12 and the side panels 13 of the dock shelter 11 define an opening O which is slightly less than the cross-sectional dimension of a truck body to be positioned in the dock shelter 11 for loading and unloading. So positioned, the top panel 12 engages the top of the truck body and the side panels 13 engage the sides of the truck body. The panels 12 and 13 are subjected to considerable stress and wear from repeated movement against the sides of the truck bodies caused by the movement of the trucks and the movement of the panels by the winds.

A third form of dock shelter is illustrated in FIG. 1B. There, the opening O has a cross-sectional area comparable to that previously described to accommodate an end of a truck or trailer being loaded or unloaded. The marginal edges of the opening O in FIG. 1B are defined by shock absorbent pads or bumpers 15 at the sides of the opening O and a shock absorbent pad or bumper 16 across the top of the opening. The pads 15 and 16 may comprise a core formed of resilient foam or the like an a covering of fabric 10. Or, the pads 15 and 16 may be pneumatic as shown in U.S. Pat. No. 4,293,969 with an outer covering of fabric 10.

In the prior art, fabrics intended for use as dock shelter fabrics were canvas or truck tarpaulin grade fabrics heavily coated with an abrasion resistant polymer such as vinyl or neoporene. The resulting fabric was heavy (35 ounces per yard) and stiff, measuring at least forty (40) mils in thickness.

The abrasion resistant fabric 10 of this invention has been developed to provide abrasion resistance without the sacrifice of flexibility heretofore considered inherent in the processing of cloth to improve its abrasion resistance. The fabric 10 comprises a core 20 woven, or otherwise formed, from the class of synthetic fibers described in the SUMMARY OF THE INVENTION and bonded on at least one surface with a first or base coating 21 of a polymer such as polyvinylchloride, urethane, a urethane/vinyl blend, neoprene, Hypalon, ethylene propylene diene terpolymer, chlorinated polyethylene, thermopolastic polyester ether elastomer, acrylic, or the like. A coating 22 of the same or corresponding material is preferably applied to the other side of the base or core fabric 20.

The coatings 21 and 22 are continuous along their respective surfaces of the core 20 and the coating 21 on the surface 23 intended to be exposed to abrasion is preferably thinner than the coating 22 on the other surface. The thickness of the base coating 21 on the exposed surface 23 has an inverse effect on the flexibility and on the abrasion resistance of the fabric. A thin base coat results in a flexible fabric with minimal abrasion resistance, while a thick base coat reduces the flexibility and increases the resistance to abrasion.

The base coat 21 applied to the exposed surface 23 of core fabric 20 is significantly thinner than that applied to prior art dock shelter fabrics so as to provide a flexible fabric. Satisfactory results have been obtained with a base coat 21 providing a composite thickness of twenty-five (25) mils, compared with forty (40) mils in the prior art dock shelter fabric.

Figure 3:
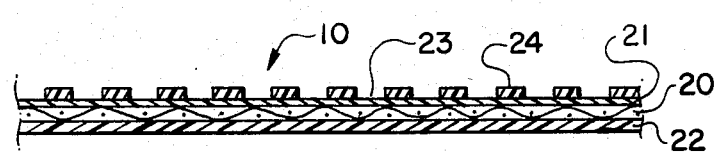
FIG. 3 is a sectional view taken substantially along the Line 3—3 in FIG. 2.
Figure 2:
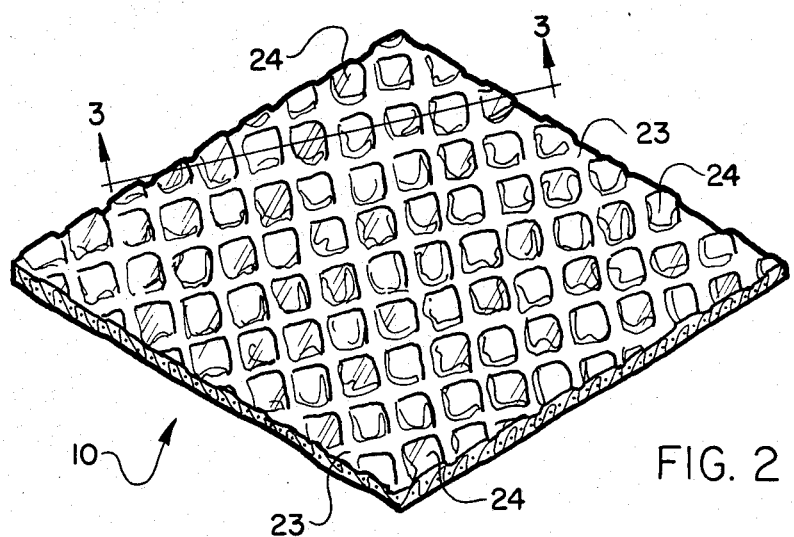
FIG. 2 is a perspective view of the abrasion resistant fabric with the abrasion resistant coating applied in a dot pattern.
Figure 4:
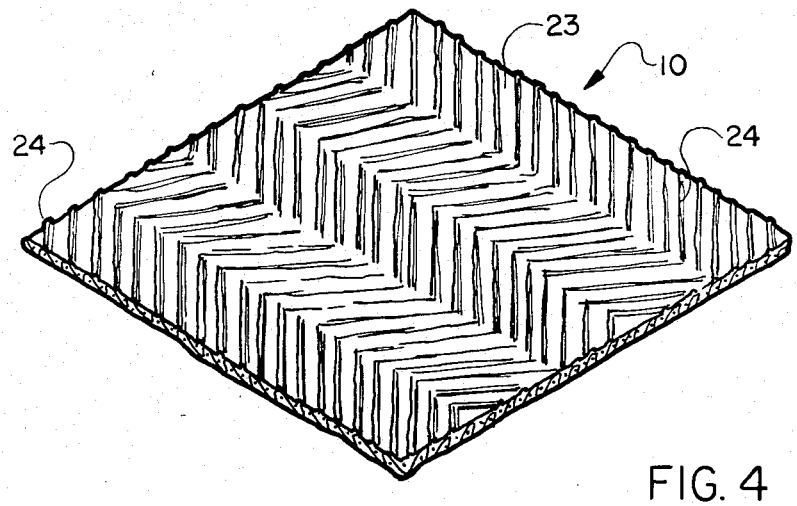
FIG. 4 is a view similar to FIG. 2 but showing the abrasion resistant coating applied in a line pattern.

According to the present invention, the degree of abrasion resistance can be increased while retaining the inherent flexibility of a thin continuous base coat of a desired polymer by applying in a spaced dot or line pattern on the base coat a second coat of an abrasion resistant polymer such as polyvinylchloride, chlorinated polyethylene, urethane, epoxy, or desired polymer blends as indicated at 24 in FIGS. 2, 3 and 4. The spaced pattern of the second coat 24 presents an effective abrasion resistant surface without sacrificing the flexibility of the fabric, as had been necessary in the prior art.

As a specific example, dock shelter fabric according to the invention with a continuous base coat on both surfaces of the core fabric and a discontinuous abrasion resistant coat fused to one surface of the continuous base coat weighs twenty-six (26) ounces per yard and measures thirty (30) mils overall.

An example of the discontinuous abrasion resistant coat 24 is a vinyl plastisol made from the following formulation:

150 lbs. of dioctyl phthalate used as a plasticizer 170 lbs. of polyvinylchloride polymer used as a binder 5 lbs. of Barium cadium zinc stablizer used as a stablizer 9 lbs. of aliphathic naptha used as a solvent 5 lbs. of colloidal silica used for the control of viscosity 30 lbs. of a desired color pigment dispersion This formulation, or any desired formulation, for the abrasion resistant second coat 24 is placed on the base coat 21 in a known manner, as by putting a quantity of the formulation for the abrasion resistant second coat 24 in a vat in which an engraved roll is partially submerged for rotation with part of its circumference within the vat and part of its circumference above the vat. The roll is engraved with a spaced pattern defined by dots or lines, as desired. The core fabric 20 with its previously applied base coat of polyvinylchloride 21 on at least one surface is trained between the engraved roll and a pressure roll and the rolls are rotated to present a spaced pattern of the abrasion resistant plastisol 24 to the base coat 21 which is intended to become the exposed surface 23 of the fabric. A doctor blade may be used to present a uniform amount of the plastisol 24 to the base coat 21. Alternatively, the plastisol 24 may be applied to the base coat 21 by an extrusion process or by laminating.

After the spaced pattern of the final abrasion resistant coat 24 is applied to the base coat 21, the fabric moves through a curing oven where the continuous base coat 21 and spaced abrasion resistant coat 24 are fused at 400 degrees Fahrenheit for two minutes.

The resulting fabric is both abrasion resistant and flexible to an extent not heretofore known in the prior art. Although the invention is described in the environment of a dock shelter fabric, it is to be understood that the utility of the invention is not limited to dock shelter fabrics and it may be used in any environment requiring flexibility and abrasion resistance. Suggested uses are truck tarpaulins, dock shelters, dock pads and tents.

Although specific terms have been employed in the specification, they are used in a generic sense for purposes of illustration and not as a limitation.

I claim:

1. A dock shelter fabric comprising a core fabric formed from synthetic fibers, a base coat of polymeric material extending continuously over at least the one surface of the core fabric intended to be exposed to abrasion, and a second polymeric coating of abrasion resistant polymeric material fused in a discontinuous pattern to the continuous surface of the base coat; whereby the discontinuous coating resists abrasion without sacrificing flexibility of the fabric.

2. A dock shelter fabric according to claim 1 wherein the synthetic fibers in the core fabric are nylon, the first coating is polyvinylchloride, and the second coating includes polyvinylchloride as a binder.

3. A dock shelter fabric according to claim 1 wherein the fabric has an overall thickness of approximately twenty-five (25) mils after application of the continuous coating and an overall thickness of approximately thirty (30) mils after the fusing of the second polymeric coating in a discontinuous pattern to the continuous surface of the base. coat.

4. A dock shelter fabric according to claim 2 wherein the fabric has an overall thickness of approximately twenty-five (25) mils after application of the continuous coating and an overall thickness of approximately thirty

(30) mils after the discontinuous coating of abrasion resistant polymer.

5. A dock shelter fabric according to claim 1 wherein the discontinuous pattern of the abrasion resistant coat comprises a plurality of spaced dots.

6. A dock shelter fabric according to claim 1 wherein the discontinuous pattern of the abrasion resistant coat comprises a plurality of spaced lines.

7. An abrasion resistant fabric comprising a core fabric, a base coat of polymeric material extending continuously over opposed surfaces of the core fabric, the said base coat being applied to the one surface of the core fabric intended to be exposed to abrasion in a thinner application than the base coat on the opposed surface of the core fabric, and an abrasion resistant coat fused in a spaced pattern to the surface of the base coat on said one surface; whereby there is provided a flexible fabric which is abrasion resistant.

8. An abrasion resistant fabric according to claim 7 wherein the core fabric is nylon.

9. An abrasion resistant fabric according to claim 8 wherein the continuous base coat is polyvinylchloride and the discontinuous coat is epoxy.

10. An abrasion resistant fabric according to claim 8 whreein the continuous base coat is polyvinylchloride and the discontinuous coat is urethane.

11. An abrasion resistant fabric according to claim 8 wherein the continuous base coat is polyvinylchloride and the discontinuous coat is polyvinylchloride.

12. An abrasion resistant fabric according to claim 8 wherein the continuous base coat is urethane and the discontinuous coat is urethane.

13. An abrasion resistant fabric according to claim 8 wherein the continuous base coat is neoprene and the discontinuous coat is urethane.

14. An abrasion resistant fabric according to claim 8 wherein the continuous base coat is urethane and the discontinuous coat is epoxy.

15. In a dock shelter having a top panel or pad and side panels or pads, a fabric at the top and sides of the dock shelter combining the attributes of abrasion resistance and flexibility, said fabric comprising a core, a first polymeric coating applied to at least one surface of the core to form a composite cloth having a thickness not exceeding twenty-five (25) mils, and a second polymeric coating of abrasion resistant material fused to the first polymeric coating in a discontinuous pattern leaving portions of the first polymeric coating exposed between spaced portions of the second coating, and the overall thickness of the twice coated fabric not exceeding thirty (30) mils; whereby the discontinuous abrasion resistant coating enhances the abrasion resistance of the fabric and retains its flexibility.

16. A method providing the characteristics of abrasion resistance and flexibility in a dock shelter fabric comprising the steps of:
(a) forming a fabric,
(b) applying a continuous coating of a first polymer to at least one side of the fabric to produce a composite fabric approximately twenty-five (25) mils thick,
(c) applying a second polymeric coating of abrasion resistant material in a discontinuous pattern to the continuous coating, and
(d) fusing the second coating to the first coating.

17. A method of producing an abrasion resistant fabric according to claim 16 wherein the second coating is a polymer having a higher abrasion resistance than the first polymeric coating.

18. A method according to claim 17 wherein the first polymeric coating is polyvinylchloride and the second polymeric coating is urethane.

19. A method according to claim 16 wherein the first polymeric coating is polyvinylchloride and wherein the second polymeric coating is polyvinylchloride.

20. A method according to claim 16 wherein the first polymeric coating is polyvinylchloride and the second polymeric coating is a formulation comprising polyvinylchloride as a binder, dioctyl phthalate as a plasticizer, barium cadium as a stabilizer, aliphathic naphtha as a solvent, colloidal silica as viscosity control, and a desired pigment dispersion.

21. A method according to claim 16 wherein the continuous base coat is acrylic and the discontinuous coat is polyvinylchloride.

22. A method according to claim 16 wherein the continuous base coat is polyvinylchloride and the discontinuous coat is epoxy.

23. A method according to claim 16 wherein the continuous base coat is urethane and the discontinuous coat is epoxy.

24. A method according to claim 16 wherein the continuous base coat is neoprene and the discontinuous coat is epoxy.

25. A method according to claim 16 wherein the continuous base coat is Hypalon and the discontinuous coat is epoxy.

26. A method according to claim 16 wherein the continuous base coat is ethylene propylene diene terpolymer and the discontinuous coat is epoxy.

27. A method according to claim 16 wherein the continuous base coat is urethane and the discontinuous coat is epoxy.

28. A method according to claim 16 wherein the continuous base coat is polyvinylchloride and the discontinuous coat is urethane.

29. A method according to claim 16 wherein the continuous base coat is neoprene and the discontinuous coat is urethane.

30. A method according to claim 16 wherein the continuous base coat is urethane and the discontinuous coat is urethane.

31. A method according to claim 16 wherein the continuous base coat is acrylic and the discontinuous coat is urethane.

32. A method according to claim 16 wherein the continuous base coat is chlorinated polyethylene and the discontinuous coat is epoxy.

33. A method according to claim 16 wherein the continuous base coat is chlorinated polyethylene and the discontinuous coat is urethane.

34. A method according to claim 16 wherein the continuous base coat is chlorinated polyethylene and the discontinuous coat is polyvinylchloride.

35. A method according to claim 16 wherein the continuous base coat is chlorinated polyethylene and the discontinuous coat is chlorinated polyethylene.

36. A method according to claim 16 wherein the continuous base coat is thermoplastic polyester ether elastomer and the discontinuous coat is chlorinated polyethylene.

37. A method according to claim 16 wherein the continuous base coat is thermoplastic polyester ether elastomer and the discontinuous coat is epoxy.

38. A method according to claim 16 wherein the continuous base coat is thermosplastic polyester ether elastomer and the discontinuous coat is urethane.

39. A structure according to claim 16 wherein the continuous base coat is thermoplastic polyester ether elastomer and the discontinuous coat is polyvinylchloride.

* * * * *